UNITED STATES PATENT OFFICE.

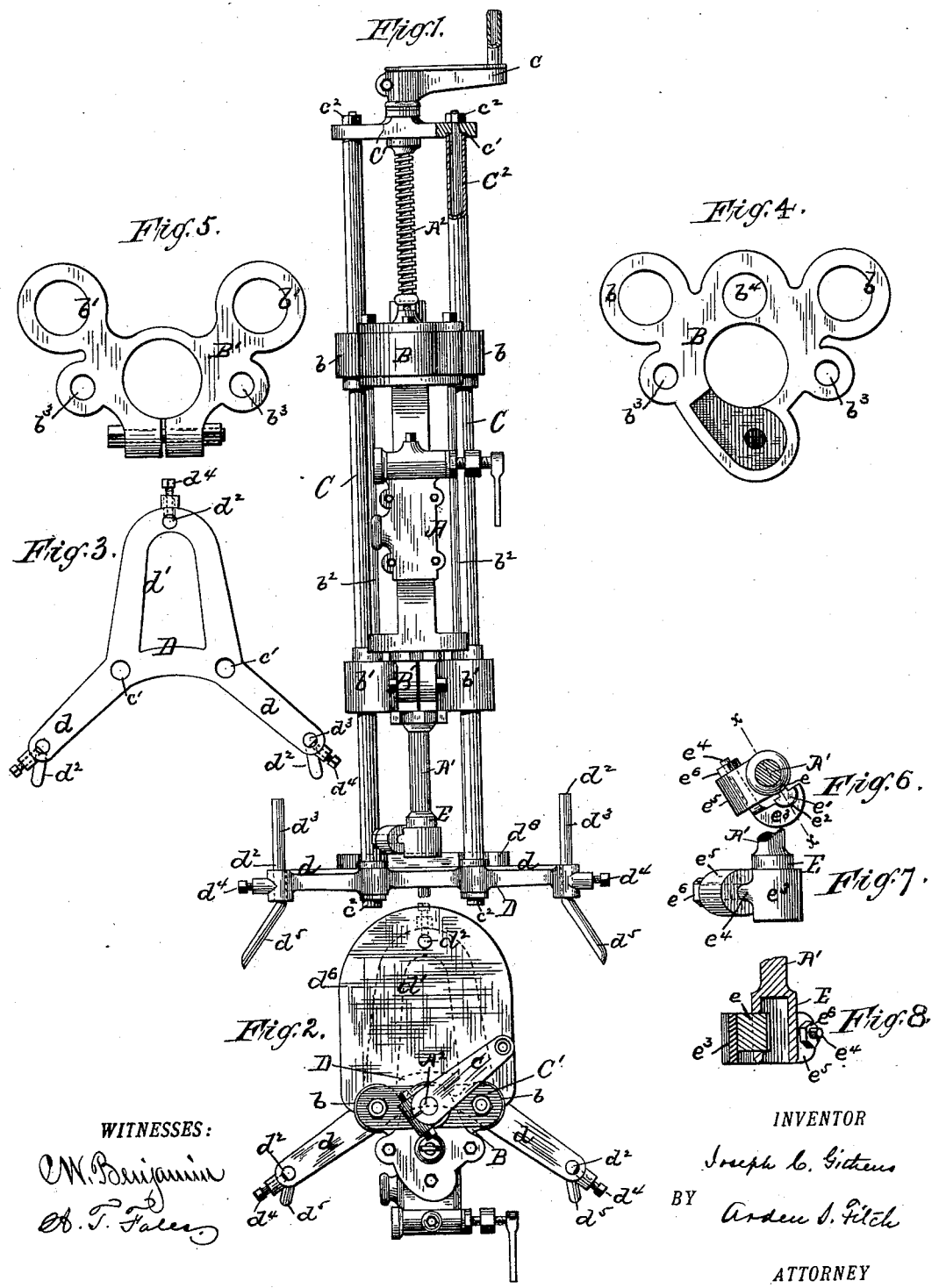

JOSEPH C. GITHENS, OF NEW YORK, N. Y., ASSIGNOR TO THE RAND DRILL COMPANY, OF NEW YORK.

STEAM ROCK-DRILL.

SPECIFICATION forming part of Letters Patent No. 408,878, dated August 13, 1889.

Application filed February 11, 1888. Renewed January 31, 1889. Serial No. 298,251. (No model.)

*To all whom it may concern:*

Be it known that I, JOSEPH C. GITHENS, of the city, county, and State of New York, and a citizen of the United States, have invented certain new and useful Improvements in Steam Rock-Drills, of which the following is a full, clear, and exact description, reference being had to the accompanying drawings, forming part of this specification.

My invention relates to steam rock-drills; and the object of my invention is to provide a rock-drill in which is comprised a motor-cylinder driven by steam or air, which is easily and conveniently portable by the workman who operates it, which is simple and economical in structure, and which is strong and durable in practical use; and my invention consists in the devices and parts and their combinations hereinafter described, and more particularly recited in the claims.

Figure 1 is a front elevation of a rock-drill containing my invention. Fig. 2 is a plan of the same. Fig. 3 is a plan of the tripod detached. Fig. 4 is a plan of the upper head of the cylinder detached. Fig. 5 is a similar view of the lower head of the cylinder. Fig. 6 is a plan of the chuck. Fig. 7 is a side elevation of the same; and Fig. 8 is a vertical section of the same on the line $x\ x$, Fig. 7.

A is the drill-cylinder.

A' is the piston-rod which operates the drill-tool and which carries the tool-holding chuck E on its free end.

$A^2$ is the feed-screw.

The upper cylinder-head B is formed or provided with the lugs $b$, which are bored through, as shown, and the lower cylinder-head B' is similarly formed or provided with lugs $b'$, which are also bored through, and said lugs are so located and arranged on the respective heads and on the opposite edges of each, as shown, that the apertures in the lugs on the corresponding sides of the two heads will correspond when the heads are bolted in place on the respective ends of the cylinder. The heads are conveniently held to the cylinder ends by the long bolts $b^2$, passed through corresponding apertures $b^3$ in lugs on both heads, as shown. The feed-screw works in a threaded aperture $b^4$ in the upper head B.

C C are guides which pass through the corresponding apertures in the lugs $b$ and $b'$ on the respective upper and lower heads. The guides fit the apertures, so that the drill-cylinder may slide longitudinally thereof. At their upper ends the guides C C are tied together by a yoke C', in which the feed-screw $A^2$ is conveniently given a threaded bearing, as shown, and above which said feed-screw is furnished with its operating-crank $c$. At their lower or opposite ends the guides C C are seated upon and bolted to the frame of my tripod D and extend vertically upward therefrom.

I find it desirable to constitute the guides C C of piping or tubing and to seat the ends of the same in suitable recesses $c'$ in the yoke C' and the tripod-frame and to provide the long bolts $C^2$, extending longitudinally through said tubes and held by nuts $c^2$, as shown.

The tripod or standard D is constructed with arms or extensions on its frame or platform, which reach beyond the front or forward side of the drill and the guides C, as are shown at $d\ d$, and with an arm $d'$, (one or more,) reaching to the rearward of the drill and its guides, as shown. The frame D is preferably in the form of a spider, as shown in Fig. 3, the arms $d\ d$ extending forward and somewhat to the side in opposite directions, and the rear arm $d'$ constituting a perforated or skeleton platform, as shown, and the bolt-holes for the bolts sustaining the guides C C being in the standard at or about the junction of each arm $d$ with said platform $d'$. In the extremities of the arms are the legs $d^2$, which are preferably composed of rods having a vertical portion $d^3$, seated in an aperture in the arm and adapted to slide vertically therein and to be held in adjustment therein by means of set-screws $d^4$, and, furthermore, of an outwardly-inclined portion $d^5$ below the standard, as shown. The arm or skeleton platform $d'$ may be provided with a supplemental plate or platform $d^6$, if desired.

By means of the construction and combination of parts shown and described I produce a rock-drill in which the cylinder and its operative parts are provided with a light-weight frame for supporting the same, and upon which the cylinder may be slid vertically in feeding the drill, and which, by means of the described platform or standard D, the workman operating the machine may hold the same steady during working by bearing his own weight upon the platform $d'$ or by placing one foot upon it the form of the standard; and when thus steadied, securing its firm and fixed position on the ground or rock. The employment of large, heavy, and cumbersome weights upon the legs or base of the apparatus is thus obviated, and, while it is evident that the frame may, if desired, be readily taken apart, it is also evident that the structure as a whole may be readily and conveniently transported by the workman from place to place.

I have devised the form of chuck shown at E as specially adapted for use in connection with a drill mounted on the described guides and standard. The chuck is preferably formed upon and as part of the piston-rod, as shown. The wall of the chuck-recess is slotted, as shown in Fig. 8, and in this slot is fitted to work a key $e$, adapted to bear against the drill-tool, and having a head $e'$, which fits in a groove $e^2$ in the head $e^3$ of a clamping-bolt $e^4$. The shank of the bolt $e^4$ is at one side or edge of its said head $e^3$, and the head is adapted in area to reach across the slotted side of the chuck and embrace the key, while the shank passes through a lug $e^5$, formed on the outside of the chuck, and beyond the same is furnished with a holding-nut $e^6$.

By means of the described devices the drill-tool may, obviously, be secured firmly in the chuck, and when it is desired to release the tool this may be readily done in the comparatively limited space between the guides C C by loosening the single nut $e^6$.

What I claim as my invention, and desire to secure by Letters Patent, is—

1. In a rock-drill, the combination, with the steam-cylinder A and its piston and piston-rod A', the cylinder having described lugs $b\ b'$ and being provided with feed-screw $A^2$, of two parallel guide-rods C C, carrying and traversed by said cylinder, and a yoke C', uniting said rods and giving bearing for said feed-screw, together with the horizontal standard D, composed of the radially and forwardly extended arms $d\ d$ and the rearwardly-extended frame $d'$, the two said guide-rods being mounted vertically on said standard, so that the piston-rod of the cylinder will reciprocate the drill-tool between the forward arms thereof, and said arms and frame of said standard being provided with supporting-legs $d^2$, substantially as and for the purpose set forth.

2. In a rock-drill, the combination, with the piston-rod, of a chuck E, having the external side lug $e^5$, the key $e$, working in a slot in the side wall of the chuck-body, together with a single clamping-bolt $e^4$, adapted to be seated in said side lug, and having the hooked head $e^3$, engaging said key, together with the nut $e^6$, all constructed and arranged to operate as and for the purpose set forth.

JOSEPH C. GITHENS.

Witnesses:
A. S. FITCH,
A. T. FALES.